United States Patent Office 3,284,237
Patented Nov. 8, 1966

3,284,237
THERMAL IMPREGNATING PROCESS FOR NEGATIVE ELECTRODES
Robert L. Lambert and Russell E. Palmateer, Emporium, Pa., assignors to Sylvania Electric Products Inc., a corporation of Delaware
No Drawing. Filed Apr. 16, 1965, Ser. No. 448,840
4 Claims. (Cl. 136—24)

This invention relates to the preparation of plates suitable for use in alkaline storage batteries and more particularly to the preparation of plates suitable for use as negative electrodes in a nickel-cadmium battery.

In the preparation of plates for storage batteries, it has been a common practice to impregnate a porous metal structure with a nitrate solution, electrolytically treat the impregnated plate to provide an electrically active compound, and to dispose the treated plate in conjunction with a plate of opposite polarity in an aqueous potassium hydroxide solution to provide a cell which is cyclically charged and discharged to activate the impregnated compound. Also, the impregnation and electrolytic treatments are repeated a number of times in order to provide plates having electrical capacity sufficient to warrant their use in commercial batteries.

While the above-mentioned process has been and still is extensively used to provide plates which fulfil the requirements necessary for commercial use, it is well known that such a process is time consuming, tedious, expensive, and ill-adapted to a continuous plate fabrication technique. Also, material waste and deposition of waste materials are further complications and expenses associated with such a process.

In an effort to overcome, or at least greatly reduce, the above-mentioned undesirable features of such a process, the electrolytic treatment has been replaced by a thermal treatment such as suggested in U.S. Patent No. 2,831,044. Therein, a nickel plate is impregnated with a metal nitrate, roasted, and immersed in hot aqueous caustic solution to provide an electrically active compound such as $Ni(OH)_2$ within the pores of the plate.

While the above-mentioned technique may be satisfactory for the fabrication of positive electrodes for batteries, it has been found that such a process in unsatisfactory for the fabrication of negative electrodes wherein a porous nickel plate is impregnated with cadmium nitrate. In such a process, it has been found that the nickel plate is attacked during thermal decomposition causing the rapid formation of undesired nickel nitrate and disintegration of the plate structure itself.

In an attempt to utilize the advantages of a thermal decomposition technique to provide negative electrodes for a nickel-cadmium type battery and also alleviate the above-mentioned undesired nitrate formation and plate disintegration problems, it has been suggested that the nitrate reduction portion of the process take place in a hydrogen atmosphere. For example, one known method proposes the heating of a cadmium nitrate filled nickel plaque for at least ½-hour at a temperature of 200° to 300° C. in a hydrogen atmosphere. Thereafter, the plaque is allowed to cool in the hydrogen atmosphere, removed therefrom, washed in distilled water to remove loosely adhered material, and dried.

However, it has been found that the reaction of hydrogen with oxides of nitrogen in the presence of water at a temperature of about 230° C. is a relatively slow reaction. Also, it is believed that the most significant result of such a recation is the formation of nitrous and nitric acids and gases which would tend to cause the rate of attack on a nickel support to remain substantially unchanged. Moreover, it is believed that the major effectiveness of the hydrogen is in its use as a relatively inert sweep gas for removal of the above-mentioned undesired corrosive gases. Thus, the use of a relatively inert gas in a sweeping operation is applicable to numerous other types of readily available inert gases.

Therefore, it is an object of this invention to provide an enhanced process for preparing plates suitable for use as negative electrodes in a nickel-cadmium battery.

Another object of the invention is to improve the thermal decomposition portion of a process for impregnating nickel plates with an electrochemically active cadmium compound.

Still another object of the invention is to reduce the cost and increase the efficiency of a process for fabricating negative electrodes for a nickel-cadmium battery.

A further object of the invention is to facilitate the formation of neutral volatile salts by directly reacting an atmosphere with the nitrate ion and oxides of nitrogen during thermal decomposition of cadmium nitrate.

A still further object of the invention is to prevent the formation of undesired acids by directly reacting an atmosphere with the nitrate ion and oxides of nitrogen during thermal decomposition of cadmium nitrate.

These and other objects are achieved in one aspect of the invention by a process wherein a metal nitrate compound is impregnated into a porous plate and the impregnated plate is heated in an atmosphere to produce ions and oxides of nitrogen from the nitrate compound which react directly with the atmosphere to provide volatile neutral nitrate salts and the metal and oxides of the metal.

For a better understanding of the present invention, together with other and further objects, advantages, and capabilities thereof, reference is made to the following disclosure in connection with the appended claims.

In a preferred procedure for carrying out the process, a plate is selected which may be any one of a number of well-known plates commonly used in the fabrication of alkaline batteries. For example, a very common plate and one especially appropriate to the present process is a plate of nickel having a porosity in the range of about 80–85%.

The pores of the plate are impregnated with cadmium nitrate $Cd(NO_3)_2$ by any one of a number of well-known techniques. For instance, the plate may be dipped or soaked in an aqueous salt solution; a meltable hydrated salt disposed thereon and heat applied in an amount sufficient to control the hydration and flow properties thereof and the flow of salt into the pores of the plate; or the plate may be dipped in a molten bath of a salt dissolved in its own water of crystallization. Regardless of the technique, the pores of the plate are impregnated with the cadmium nitrate.

Following, the cadmium nitrate impregnated nickel plate is introduced into an ammonia atmosphere. The atmosphere, which is at a substantially ambient pressure, and the impregnated plate are heated to a temperature in the range of about 185° to 250° C. for a period in the range of about 1 to 120 minutes, During this period, the nitrate is decomposed to ions and oxides of nitrogen, accompanied by the direct reaction of the ammonia atmosphere with the nitrate ion and oxides of nitrogen to form neutral volatile salts. Brown fumes emanating from the impregnated plate during the above-mentioned heating process serve to indicate that the thermal nitrate breakdown is taking place faster than the ions or oxides of nitrogen are combining with the ammonia atmosphere. Moreover, the reaction is considered complete when a rapid increase in temperature fails to produce brown fumes.

The above-described reaction is readily controllable upon observation of the physical phenomena occurring on the surface of the plate as previously described with respect to the impregnation of a meltable salt within a porous plate and further detailed in a copending application Ser. No. 431,495, filed February 8, 1965, and entitled "Impregnation of Porous Supports." Briefly, excessive applied heat causes fusion of the nitrate on the surface of the plate, insufficient applied heat results in a low viscosity liquid because of water absorption by the residual nitrate, a slow rate of applied heat permits the formation of an unevenly distributed viscous mass because of insufficient flow properties, and too rapid a rate of applied heat causes the formation of a low viscosity liquid which drips from the plate and decreases the material and impregnation efficiency.

Alternately, the previously described thermal decomposition of cadmium nitrate impregnated within a porous nickel plate may be carried out in a combined ammonia and steam atmosphere as distinct from an ammonia atmosphere. It has been found that the addition of steam to the ammonia not only enhances the operator control over the reaction but also reduces the temperature at which the reaction takes place. Thus, overheating and fusion are prevented and in addition to a minor portion of cadmium oxide impregnated within the pores of the plate, the major cadmium metal portion has a maximum surface area which tends to provide a plate having a maximum obtainable output. Moreover, the above-described process may be repeated until the desired amount of material is impregnated within the plate or a plate having the desired output capability is provided.

Upon completion of the above-described thermal decomposition process, there is provided an impregnated nickel plate having a color which may best be described as blued steel which is believed to be indicative of cadmium metal and oxides of cadmium. Also, the plate had no evidence of loosely adhering or scaled materials which obviates all washing and drying requirements intermediate repetitive impregnating steps.

In still another embodiment of the process, a cadmium salt is impregnated in a porous plate by any one of a number of well-known techniques. The impregnated plate is introduced into an ammonia or an ammonia and steam atmosphere at ambient pressure and heated to a temperature in the range of about 185° to 250° C. for a period ranging from about 1 to 120 minutes to decompose the salt to metallic cadmium and neutral volatile salts.

The metallic cadmium covered plate is then removed from the atmosphere and again impregnated with a cadmium salt. The salt impregnated cadmium covered plate is then disposed within an atmosphere of air or steam at ambient pressure and heated to a temperature in the range of about 185° to 250° C. for a period of about 1 to 120 minutes to decompose the salt to metallic cadmium and oxides of cadmium.

Following, the cadmium covered plate is again impregnated with a cadmium salt which is thermally decomposed in steam or air in a manner substantially as described above. Moreover, this cycle is repeated as many times as is required to obtain the desired amount of impregnated cadmium or a plate having the desired electrical capabilities.

As a specific illustration, a carbonyl nickel plate having a porosity of 80–85% was dipped in molten cadmium nitrate. The plate was then placed in a chamber containing an ammonia and steam atmosphere at ambient pressure. Heat was applied to the chamber and the temperature of the plate was rapidly raised to about 250° C. This temperature was maintained for a period of about 3 to 5 minutes at the end of which decomposition of the cadmium nitrate had been completed.

The plate was removed from the atmosphere and the above-described dipping and decomposition cycle was repeated a total of three times. Thereafter, the plate was placed in a potassium hydroxide solution along with a plate of positive polarity and electrically activated by a cycle of charging and discharging steps normally used in fabricating batteries. The resultant negative electrode had substantially the same electrical capabilities as a similar plate wherein decomposition was achieved by an electrolytic process.

Thus, there has been provided a unique process for preparing plates for use as negative electrodes in a nickel-cadmium battery. The process has not only reduced material waste and increased material utilization but also has provided an operational efficiency which is unobtainable by any other known process. Also, the process has virtually eliminated the formation of undesired acids and the dilution of the cadmium impregnating salt with nickel salt when utilized with a nickel plate. Thus, the plate or support structure is no longer weakened during impregnation by a thermal decomposition technique and an improved electrical capability is achieved. Moreover, the tenacious adherence of the impregnated material to the plate obviates the necessity of additional washing and drying procedures and, as far as is known, is unobtainable by any other process.

While there have been shown and described what are at present considered the preferred embodiments of the invention, it will be obvious to those skilled in the art that various changes and modifications may be made therein without departing from the invention as defined by the appended claims.

What is claimed is:

1. In a process for preparing electrodes for alkaline batteries, the steps comprising:
  impregnating a porous plate with a cadmium nitrate compound and heating the impregnated plate in a reducing atmosphere to a temperature in the range of about 185° C. to 250° C., at substantially ambient pressure and from about one minute to two hours, to reduce said compound to metal, said reducing atmosphere consisting of water vapor and ammonia and being characterized by the capability to combine with the compound to form volatile neutral salts.

2. In a process for preparing electrodes for alkaline batteries, the steps comprising:
  impregnating a porous plate with a hydrated cadmium nitrate compound and heating said impregnated plate to a temperature in the range of about 185° C. to 250° C., at substantially ambient pressure and from about one minute to two hours in an ammonia atmosphere to provide an ammonia-steam atmosphere to reduce said compound to said metal.

3. The process of claim 2 wherein steam is introduced into said ammonia atmosphere to provide an ammonia-steam atmosphere to reduce said compound to said metal.

4. In a process for preparing electrodes for alkaline batteries, the steps comprising:
  impregnating a porous nickel plate with a cadmium nitrate compound, heating the impregnated plate in an ammonia-steam atmosphere to a temperature in the range of about 185° C. to 250° C., at substantially ambient pressure and from one minute to two hours to reduce said compound to a coating of said metal substantially covering the nickel plate, removing the metal-covered nickel plate from said ammonia-steam atmosphere, introducing a metal nitrate compound into the pores of said metal-covered plate, and heating said compound-filled metal-covered plate in air to reduce said compound to metal.

References Cited by the Examiner
UNITED STATES PATENTS

| | | | |
|---|---|---|---|
| 1,988,861 | 1/1935 | Thoraush et al. | 136—29 X |
| 2,831,044 | 4/1958 | Bourgault et al. | 136—29 |
| 2,880,257 | 3/1959 | Murphy et al. | 136—29 |
| 3,068,310 | 12/1962 | Casey et al. | 136—29 |

OTHER REFERENCES

Mellor: Comprehensive Treatise on Inorganic and Theoretical Chemistry, volume 15, p. 414, 1936.

WINSTON A. DOUGLAS, *Primary Examiner.*

B. J. OHLENDORF, A. SKAPARS, *Assistant Examiners.*